(12) United States Patent
Balakrishnan et al.

(10) Patent No.: US 12,169,831 B1
(45) Date of Patent: Dec. 17, 2024

(54) SYSTEMS AND METHODS FOR DISTRIBUTED MANAGEMENT OF NEGATIVE CERTIFICATES FOR BLOCKCHAIN-BASED VALUE EXCHANGE TRANSACTIONS

(71) Applicant: Wells Fargo Bank, N.A., San Francisco, CA (US)

(72) Inventors: Sathya K. Balakrishnan, Bangalore (IN); Shanmukeswara R. Donkada, Hyderabad (IN); Madhu Gumballi, Bengaluru (IN); Rameshchandra B. Ketharaju, Telangana (IN); Niraj Kumar, Bangalore (IN); Ramanathan Ramanathan, Bellevue, WA (US); Chandrasekaran Sivaraman, Bangalore (IN); Lakshmi Sowrirajan, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 14 days.

(21) Appl. No.: 17/498,692

(22) Filed: Oct. 11, 2021

Related U.S. Application Data

(63) Continuation of application No. 15/650,562, filed on Jul. 14, 2017, now Pat. No. 11,170,370.

(51) Int. Cl.
*G06Q 20/38* (2012.01)
*G06Q 20/06* (2012.01)
(Continued)

(52) U.S. Cl.
CPC ..... *G06Q 20/3829* (2013.01); *G06Q 20/0658* (2013.01); *G06Q 20/38215* (2013.01);
(Continued)

(58) Field of Classification Search
CPC .......... G06Q 20/3829; G06Q 20/0658; G06Q 20/38215; G06Q 20/401; G06Q 20/4016; H04L 9/50
See application file for complete search history.

(56) References Cited

U.S. PATENT DOCUMENTS

| 5,005,200 A | 4/1991 | Fischer |
| 8,117,644 B2 | 2/2012 | Chaganti et al. |

(Continued)

FOREIGN PATENT DOCUMENTS

WO    WO-2016/204461    12/2016

OTHER PUBLICATIONS

Satoshi Nakamoto, Bitcoin: A Peer-to-Peer Electronic Cash System, Jul. 4, 2010, www.bitcoin.org (Year: 2010).*

(Continued)

*Primary Examiner* — Zeshan Qayyum
*Assistant Examiner* — Taylor S Rak
(74) *Attorney, Agent, or Firm* — Foley & Lardner LLP

(57) ABSTRACT

A system and methods include a negative certificate authority for distributed management of negative certificates. An authorization restriction is associated with an untrusted user. A negative certificate generated for the untrusted user includes a public key associated with the untrusted user and an authorization restriction. The authorization restriction includes at least one global restriction, which is applicable to each consortium member that subscribes to the negative certificate. The authorization restriction includes at least one local restriction, which allows individual consortium members to further define their own locally applicable restrictions using the negative certificate authority. The negative certificate is accessible to each member of the consortium to enforce the authorization restriction against a transaction request. A secure contributor record including a unique (Continued)

cryptographically generated address is generated for each contributor. In some embodiments, the transaction request is a blockchain-based value exchange transaction, such as a payment transaction using fiat or math-based currency.

17 Claims, 3 Drawing Sheets

(51) Int. Cl.
  *G06Q 20/40* (2012.01)
  *H04L 9/00* (2022.01)
(52) U.S. Cl.
  CPC ....... *G06Q 20/401* (2013.01); *G06Q 20/4016* (2013.01); *H04L 9/50* (2022.05)

(56) References Cited

U.S. PATENT DOCUMENTS

| | | | | |
|---|---|---|---|---|
| 11,170,370 | B1* | 11/2021 | Balakrishnan | G06Q 20/4016 |
| 2009/0300749 | A1* | 12/2009 | Delia | H04L 63/083 |
| | | | | 713/153 |
| 2013/0024364 | A1* | 1/2013 | Shrivastava | G06Q 20/12 |
| | | | | 705/39 |
| 2013/0046661 | A1* | 2/2013 | Levin | G06Q 40/02 |
| | | | | 705/30 |
| 2013/0151391 | A1* | 6/2013 | Simonoff | G06Q 40/04 |
| | | | | 705/37 |
| 2016/0203496 | A1 | 7/2016 | Guerrero et al. | |
| 2016/0330027 | A1 | 11/2016 | Ebrahimi | |
| 2016/0364723 | A1* | 12/2016 | Reese | G06Q 20/202 |
| 2017/0132630 | A1* | 5/2017 | Castinado | G06Q 20/4014 |
| 2017/0155515 | A1 | 6/2017 | Androulaki et al. | |
| 2017/0346639 | A1 | 11/2017 | Muftic | |
| 2018/0039667 | A1* | 2/2018 | Pierce | H04L 9/3247 |
| 2018/0131706 | A1* | 5/2018 | Anderson | H04L 9/32 |
| 2018/0218176 | A1* | 8/2018 | Voorhees | G06Q 20/02 |
| 2018/0315025 | A1* | 11/2018 | Mckay | G06Q 20/223 |

OTHER PUBLICATIONS

Final Office Action on U.S. Appl. No. 15/650,562 dated Apr. 9, 2020.
Non-Final Office Action on U.S. Appl. No. 15/650,562 DTD Oct. 17, 2019.
Notice of Allowance in U.S. Appl. No. 15/650,562 dated Jul. 9, 2021.
US Office Action on U.S. Appl. No. 15/650,562 dated Jan. 7, 2021.

* cited by examiner

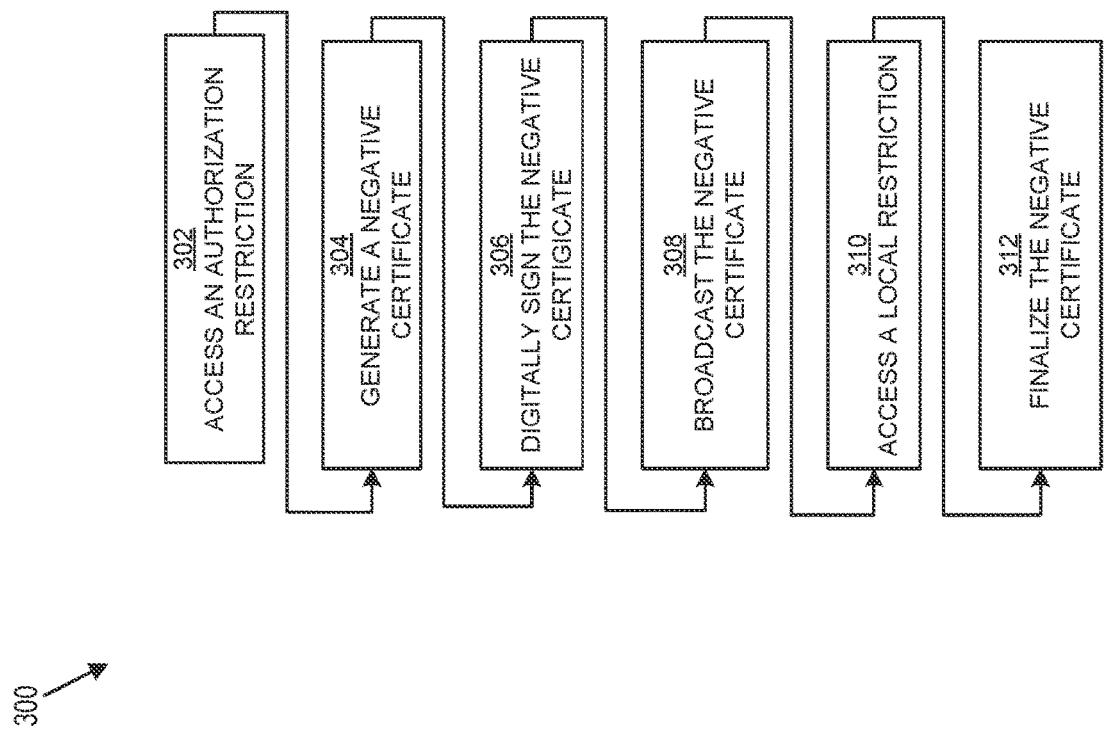

SYSTEMS AND METHODS FOR DISTRIBUTED MANAGEMENT OF NEGATIVE CERTIFICATES FOR BLOCKCHAIN-BASED VALUE EXCHANGE TRANSACTIONS

CROSS-REFERENCE TO RELATED PATENT APPLICATIONS

This application is a continuation of U.S. patent application Ser. No. 15/650,562, entitled "SYSTEMS AND METHODS FOR DISTRIBUTED MANAGEMENT OF NEGATIVE CERTIFICATES FOR BLOCKCHAIN-BASED VALUE EXCHANGE TRANSACTIONS," filed Jul. 14, 2017, the entirety of which is incorporated herein by reference.

TECHNICAL FIELD

The present application relates generally to distributed ledger systems, such as blockchains.

BACKGROUND

Financial transactions (e.g., international remittances) undergo thorough checks to comply with various regulations such as know your customer ("KYC") and anti-money laundering ("AML") regulations. These checks are conducted by the sending and receiving banks separately. An example of a bank check is the verification of the remitter and/or receiver with the Office of Foreign Asset Controls ("OFAC"). If the OFAC check is clear, then the money gets sent and received by the parties uninterruptedly. However, if there is an OFAC "hit," then the transaction gets referred to a bank team that determines the next course of action. An OFAC check is an example of one "blacklist" check.

Each financial institution maintains their own blacklists. Each country also maintains their own country-wide blacklists. If a transaction gets cleared on the sending end, for example, it does not necessarily mean that the same transaction would get cleared on the receiving end. This results in the whole transaction getting canceled, incurring unnecessary costs, lost time, customer dissatisfaction and other issues.

A blockchain is a publicly viewable, append-only, distributed ledger. Blockchain entries consist of blocks of information that can include financial and other types of transactions, data records, and other information, such as timestamps. Blockchains can be permissionless or permissioned. A permissionless blockchain is one in which the identities of participants are anonymous or pseudonymous. Transactions are verified through a consensus mechanism, such as proof-of-work, in which participants agree that the fork with the lengthiest proof of work behind it at a given time is deemed the correct fork. A permissioned blockchain is one in which participant identities must be authorized to contribute to validating transactions. Permissioned blockchains can utilize various consensus mechanisms to verify transactions, such as proof-of-stake, distributed concurrence, practical Byzantine fault tolerance, etc.

SUMMARY

Various embodiments relate to a method performed by a processor of a negative certificate authority computing system.

In a method for managing user authorization via a negative certificate, a negative certificate management circuit of a negative certificate authority computing system accesses an authorization restriction associated with a user. The authorization restriction is supplied by a first entity computing system operated by a first entity, the first entity being one of a plurality of entities of a consortium. The negative certificate management circuit generates a negative certificate for the user. The negative certificate includes a public key associated with the user and the authorization restriction. The authorization restriction includes at least one of a first global restriction applicable to each of the plurality of entities of the consortium and a first local restriction applicable to the first entity. A digital signature management circuit of the negative certificate authority computing system receives digital signatures of each of the first global restriction and the first local restriction using a private key associated with the first entity. A contributor management circuit of the negative certificate authority computing system broadcasts the negative certificate to the plurality of entities of the consortium. Each of the plurality of entities of the consortium can verify the first global restriction and sign the first global restriction with a private key associated with the respective entity. The negative certificate is accessible, through the negative certificate authority computing system, by each of the plurality of entities of the consortium to enforce the authorization restriction against a transaction request including the public key associated with the user if at least one of the first global restriction and the first local restriction has been digitally signed by at least one of the entities involved in the transaction.

In another embodiment, a negative certificate authority computing system includes a negative certificate management circuit, a digital signature management circuit, and a contributor management circuit. The negative certificate management circuit is structured to access an authorization restriction associated with a user. The authorization restriction is supplied by a first entity computing system operated by a first entity, the first entity being one of a plurality of entities of a consortium. The negative certificate management circuit is structured to generate a negative certificate for the user. The negative certificate includes a public key associated with the user and the authorization restriction. The authorization restriction includes at least one of a first global restriction applicable to each of the plurality of entities of the consortium and a first local restriction applicable to the first entity. The digital signature management circuit is structured to receive digital signatures of each of the first global restriction and the first local restriction using a private key associated with the first entity. The contributor management circuit is structured to broadcast the negative certificate to the plurality of entities of the consortium. Each of the plurality of entities of the consortium can verify the first global restriction and sign the first global restriction with a private key associated with the respective entity. The negative certificate is accessible, through the negative certificate authority computing system, by each of the plurality of entities of the consortium to enforce the authorization restriction against a transaction request including the public key associated with the user, if at least one of the first global restriction and the first local restriction has been digitally signed by at least one of the entities involved in the transaction.

In certain embodiments, a non-transitory computer-readable media includes computer-executable instructions embodied therein. When executed by a processor of the negative certificate authority computing system, the instructions cause the negative certificate authority computing system to perform a process including the steps described herein.

BRIEF DESCRIPTION OF THE DRAWINGS

FIG. 3 is a schematic flow diagram of a method for managing user authorization via a negative certificate, according to an example embodiment.

Figure 1:
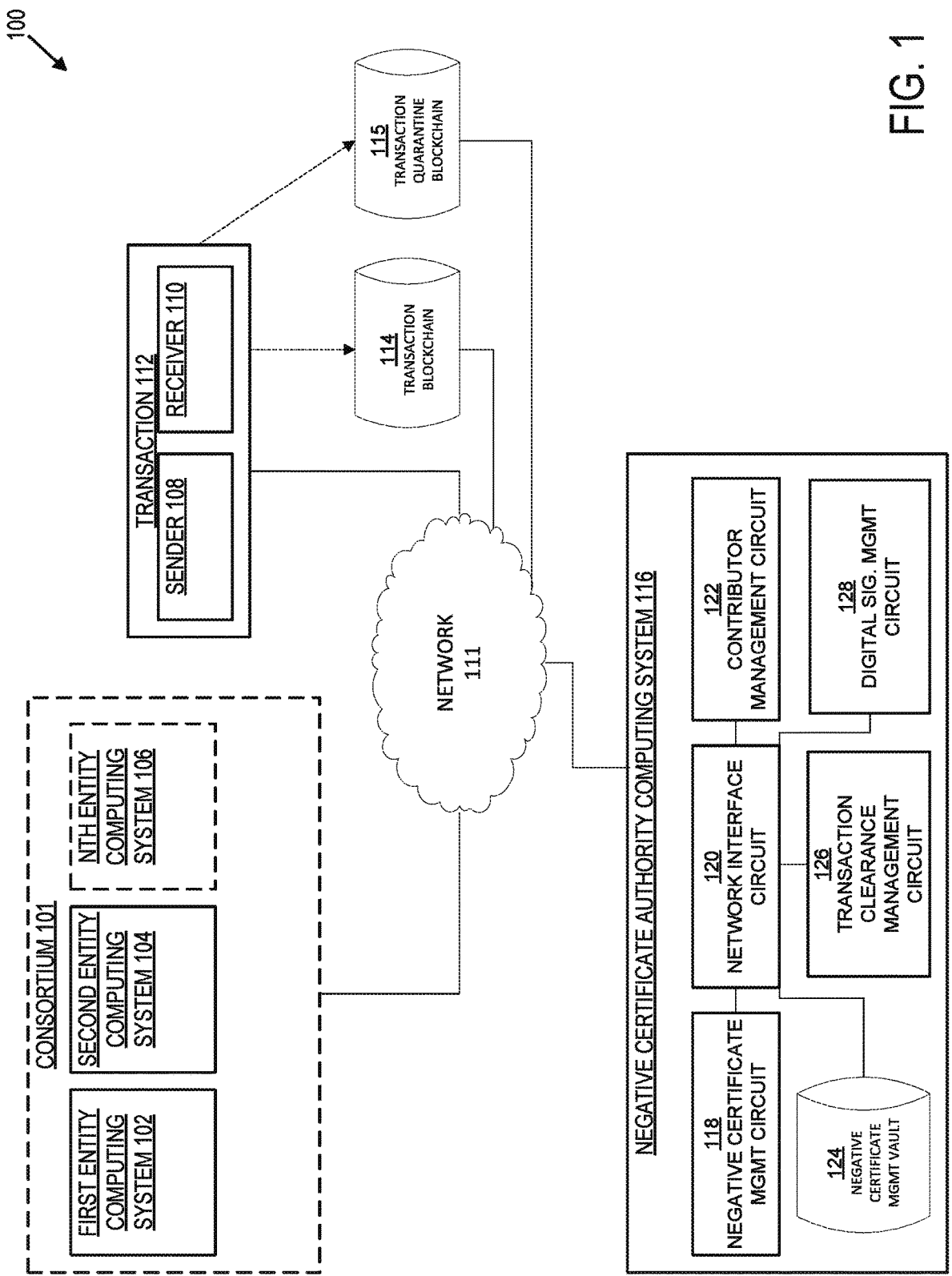
FIG. 1 is a component diagram of a systems infrastructure that includes a negative certificate authority computing system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Referring to the figures generally, various embodiments described herein relate to systems and methods for transaction management by a negative certificate authority. As will be appreciated, a system and methods include a negative certificate authority for distributed management of negative certificates. An authorization restriction is associated with an untrusted user. A negative certificate generated for the untrusted user includes a public key associated with the untrusted user and an authorization restriction. The authorization restriction includes at least one global restriction, which is applicable to each consortium member that subscribes to the negative certificate. The authorization restriction includes at least one local restriction, which allows individual consortium members to further define their own locally applicable restrictions using the negative certificate authority. The negative certificate is accessible to each member of the consortium to enforce the authorization restriction against a transaction request. A secure contributor record including a unique cryptographically generated address is generated for each contributor. In some embodiments, the transaction request is a blockchain-based value exchange transaction, such as a payment transaction using a fiat or math-based currency.

The systems and methods described herein provide a technical solution for the challenges associated with verifying certain attributes of financial transactions, beyond their origin, to minimize fraudulent fund transfers. An untrusted user is a user who has been identified by one or more members of a consortium of entities using the negative certificate authority computing system as a party or system that may be malicious or unsafe. Problematically, financial transactions are, by definition, multi-party transactions requiring at least two parties, and each party's financial platform (e.g., bank or account hosting platform) likely has its own, separate, system to identify untrusted users. This, among other issues, increases transaction settlement time and increases the risk of loss to entities who may inadvertently release funds in response to fraudulent transaction requests. Thus, another challenge addressed by the systems and methods of the present disclosure is avoiding information silos while, at the same time, allowing parties (such as banks) to customize their criteria for defining untrusted users. Advantageously, the negative certificate authority computing system allows its users to collaborate in a distributed computing environment, and to contribute to a shared repository of information associated with untrusted users. Thus, if an untrusted sender or a recipient of funds engages in a value exchange transaction, the negative certificate authority computing system can be used to restrict the user's activity even if not all the participants in the value exchange transaction know that the user is untrusted. Additionally, some embodiments of the present disclosure eliminate conventional computation-intensive, consensus-based transaction validation mechanisms used in conventional blockchain implementations.

FIG. 1 is a component diagram of a systems infrastructure 100 that includes a negative certificate authority computing system 116, according to an example embodiment. The negative certificate authority allows members to collaborate to define untrusted parties in value exchange transactions. In some embodiments, value-exchange transactions are general ledger-based. In some embodiments, value exchange transactions are blockchain-based. A blockchain transaction is defined as an event that is recorded in a blockchain block. An example is a payment/funds transfer using a math-based currency protocol, such as Bitcoin.

In some embodiments, the systems infrastructure 100 includes a first entity computing system 102, a second entity computing system 104, an optional Nth entity computing system 106, a transaction blockchain 114, a transaction quarantine blockchain 115, and a negative certificate authority computing system 116, each in operative communication with the others via a network 111. The network 111 is a telecommunications network of a suitable topology (e.g., the internet, intranet, peer-to-peer), using any suitable medium (e.g., wireless, fiber-optic, cellular, cable, telephone) and any suitable communications protocol (e.g., IEEE 802.x, Internet Protocol Suite, near-field communications).

In some embodiments, the first entity computing system 102, the second entity computing system 104, and/or the Nth entity computing system 106 are associated with, respectively, the first entity, the second entity, and/or the Nth entity. These entities comprise a consortium 101. An example of a consortium 101 is a number of different banks. Another example of a consortium 101 is a number of retailers. Yet another example of a consortium 101 is a number of municipal, state, or national government entities. In each of these scenarios, the entities collaborate with one another to pursue a common objective—for example, to optimize transaction flows and/or to prevent fraud in value exchange transactions.

In some embodiments, the negative certificate authority computing system 116 includes a negative certificate management circuit 118, a network interface circuit 120, a contributor management circuit 122, a negative certificate management vault 124, a transaction clearance management circuit 126, and/or a digital signature management circuit 128.

The negative certificate management circuit 118 allows at least one member of the consortium 101 to identify untrusted users, create and enforce authorization restrictions associated with these users, broadcast the newly added restrictions to other members of the consortium 101, and subscribe to authorization restrictions created by other members of the consortium 101. The negative certificate management circuit 118 allows its users to manage at least one negative certificate. A negative certificate is a digital file that allows multiple verified stakeholders to collaboratively define and subscribe to sets of activity restrictions associated with an untrusted user in blockchain-based value exchange transactions. In an example embodiment, authorization management using the negative certificate includes obtaining an authorization restriction from a member of the consortium 101 (indicating that the member wishes to prevent a particular untrusted user from sending or receiving funds), generating a negative certificate, allowing the member to digitally sign the negative certificate, broadcasting the negative certificate to the remaining members of the consortium 101 so that they may subscribe and/or add local restrictions, and finalizing the negative certificate by allowing review by a member of the consortium 101 and publication of the negative certificate to the negative certificate management vault 124. These features are further described in reference to FIG. 3.

The network interface circuit 120 is structured to provide connectivity between and among the components of the system 100 and is communicatively linked to the network 111.

The contributor management circuit 122 allows a member of the consortium 101 to register as a contributor. A contributor is a member authorized to issue negative certificates pertaining to untrusted users. In the example embodiment, each member of the consortium 101 (such as the first entity computing system 102, the second entity computing system 104, and the Nth entity computing system 106) is a contributor. In some embodiments, the contributor management circuit 122 is structured to receive a contributor registration request from, for example, the first entity computing system 102. The contributor management circuit 122 creates a secure contributor record, which, in some embodiments, includes a contributor identifier extracted from the contributor registration request. In the example embodiment, the contributor identifier is the consortium entity identifier 232 and/or the consortium entity identifier 244 as described in reference to FIG. 2.

In some embodiments, after the contributor registration request is received, the contributor management circuit 122 submits the secure contributor record to each of the plurality of verified validators. In some embodiments, all members of the consortium 101, other than the requestor, are verified validators, meaning that they can approve new contributors. The contributor management circuit 122 receives, from each of the plurality of verified validators, a contributor validation message. In some embodiments, the contributor validation message includes a validator identifier and a contributor validation status (for example, approved or denied). Based on the contributor validation status, the contributor management circuit 122 is structured to add the secure contributor record including the validator identifier to a contributor vault (not shown). The information contained in the contributor vault is used by the negative certificate management circuit 118 to broadcast new negative certificates created by, for example, the first entity computing system 102 to other members of the consortium 101. Other members may then subscribe to or opt out of using the broadcasted negative certificate.

The negative certificate management vault 124 is structured to manage at least one negative certificate issued by the negative certificate authority computing system. Some aspects of the structure and operation of the negative certificate management vault 124 in an example embodiment are discussed in FIG. 2.

The transaction clearance management circuit 126 is structured to validate value exchange transactions and/or route some of these transactions to a quarantine pool for further review. In some embodiments, value exchange transactions, such as the financial transaction 112, are implemented on a general ledger. In some embodiments, the value exchange transactions are implemented on a blockchain. In the example embodiment, the validated value exchange transactions are written as verified blocks to the transaction blockchain 114, and the failed value exchange transactions, such as those where the sender 108 or the receiver 110 is associated with a negative management certificate by the negative certificate authority computing system 116, are quarantined on the transaction quarantine blockchain 115.

An example of a value exchange transaction is a financial transaction 112, where, for illustrative purposes, the sender 108, located in country C1 and associated with bank B1, sends $500 to the receiver 110, located in country C2 and using bank B2. In an example embodiment, the transaction clearance management circuit 126 is structured to prevent financial transactions using a negative certificate issued by the negative certificate authority computing system 116. In the example scenario, the $500 transaction purporting to move the funds from B1 to B2 has been written to a first pre-validation pool on the transaction blockchain 114 and is pending clearance (approval). The transaction clearance management circuit 126 accesses the first pre-validation pool, which includes a first pre-validation pool identifier and first pre-validation pool content. The first pre-validation pool content includes a verification attribute. In the example embodiment, the verification attribute is a multi-value attribute, which, in this case, includes the following values: C1, B1, C2, B2, and $500 (the amount of the transaction).

The transaction clearance management circuit 126 validates the transaction against the negative certificate authority computing system 116. In an example embodiment, the transaction clearance management circuit 126 is structured, as part of this process, to extract a verification attribute value (in this case C1, B1, C2, B2, and $500) from the verification attribute. The negative certificate management vault 124 is accessed by the transaction clearance management circuit 126 to extract a negative certificate.

For illustrative purposes, assume that B2 has blocked receipts of $500 or greater per day from country C1 when the funds are sent by the sender 108 and created a negative certificate to reflect the same. C1, $500, and B2 are stored in the negative certificate management vault 124 as authorization restrictions associated with the negative certificate pertaining to the sender 108. The transaction clearance management circuit 126 evaluates the authorization restrictions against the verification attribute value obtained from the transaction 108, which is associated with the sender 108 and contains the values C1, B1, C2, B2, and $500. A match is found and the value exchange transaction is quarantined on the transaction quarantine blockchain 115 because the combination of C1, $500, and B2 make sender 108 an untrusted user, at least for the purpose of evaluating transaction 112. In a conventional system, B1 (sender 108's bank) would be unaware of B2's restrictions associated with the sender 108, and the transaction would have erroneously posted to, for example, the transaction blockchain 114.

The digital signature management circuit 128 cryptographically protects the authorization restrictions associated with a negative certificate stored in the negative certificate management vault 124. Digital signatures allow the signatories to confirm that they have subscribed to or opted out of the authorization restrictions associated with a particular negative certificate. In some embodiments, the digital signature management circuit 128 is structured to allow a member of the consortium 101 to digitally sign, by, for example, the first entity computing system 102, each of the first global restriction and the first local restriction using a private key associated with the first entity. In some embodiments, before the first entity computing system 102 is allowed to subscribe or opt out, the identity of the first entity computing system 102 is verified by, for example, verifying that the unique address from the unique cryptographically generated address string matches the IP address associated with the first entity computing system 102.

In certain embodiments, the digital signature management circuit 128 also cryptographically manages records in the contributor vault, described above in reference to the contributor management circuit 122. In some embodiments, a unique cryptographically generated address string is assigned to a contributor, such as the first entity computing system 102, to store in the secure contributor record. In some embodiments, the unique cryptographically generated address string includes the IP address associated with the first entity computing system 102. In some embodiments, the contributor management circuit is structured to select a suitable algorithm for generating a private key, generate a public key and store it in the contributor vault, generate a unique cryptographically generated address based on the public key and other parameters such as the party's IP address, and update the secure contributor record with the unique cryptographically generated address.

The negative certificate authority computing system 116 includes both global and local restrictions, which represent different levels of authorization for funds transfers that are defined by contributors associated with the negative certificate authority computing system 116. In some embodiments, the contributors are financial institutions. In an example embodiment, a first financial institution (FI1) may propose and publish a negative restriction for Person A from Country X. Other financial institutions may choose to sign onto the restriction created by F1 in its entirety or in part, or to not sign onto the restriction at all. In an example where other financial institutions subscribe to the restriction in its entirety, the restriction becomes a global restriction and thus none of these financial institutions are able to send or receive funds associated with any accounts held by Person A if the transaction originates from or has a destination of Country X. In an example where other financial institution subscribe to the restriction only partially (for example, with respect to blocking Person A regardless of the country), the subscribing institutions may be unable to send or receive funds associated with any account held by Person A, regardless of the country or countries associated with the transaction's origin or destination.

In some embodiments, a restriction is globally activated (that is, made applicable to all the subscribed contributors) in whole or in part if a threshold number of the members sign on to it. According to various embodiments, the threshold number is defined as a percentage of contributors—for example, 50%, 75%, or 100%. In some embodiments, contributors opt out of having a globally activated restriction apply to them unless they specifically subscribe to the globally activated restriction in whole or in part. In some embodiments, once a contributor is verified as described above, the digital signature management circuit 128 facilitates subscribing to or opting out of authorization restrictions by generating a first hash over the first global restriction and cryptographically protecting the first global restriction using a private key associated with the first entity.

In some embodiments, FI1 publishes local restrictions that are cryptographically protected such that only FI1 can view and subscribe to them. In some embodiments, local restrictions are cryptographically protected using SignedData and/or SigncryptedData. In an example scenario, FI1 is located in the United States and a second financial institution (FI2) is located in Iran. FI1 and/or FI2 create and subscribe to a negative certificate for Person A that specifies that Person A is not authorized for transfers between FI1 and FI2. Additionally, FI1 may have a second negative certificate for Person A with additional local restrictions, which are only applicable to F1. Examples of parameters for local restrictions include specific financial institutions (e.g., to disallow transfers to a particular bank in a geographical location known to have terrorist customers), the country in which a financial institution is located or that represents either a source or a destination for the transaction, the recipient's nationality, the recipient's citizenship, the transfer amount, and/or the currency on the originating end or on the destination end of the transaction. Global and local restrictions are further described in reference to FIG. 2.

Figure 2:
FIG. 2 is a schematic entity-relationship diagram showing some aspects of the negative certificate management vault related to a negative certificate of the negative certificate authority computing system, according to an example embodiment.

FIG. 2 is a schematic entity-relationship diagram 200 showing some aspects of the negative certificate management vault 124 related to managing the negative certificate of the negative certificate authority computing system 116, according to an example embodiment.

Advantageously, the system of FIG. 2 allows multiple stakeholders to collaboratively define a set of restrictive attributes for an untrusted user while retaining the freedom to opt out of certain restrictive attributes or subscribe to higher-level restrictions. Having both global and local restrictions means that members of the consortium 101 are not required to coordinate their policies with those of others or to monitor other members' policies. At the same time, even if they do not monitor other members' policies, as senders, they are prevented from releasing funds to the recipients untrusted by other members, which minimizes the amounts made unavailable through clearing accounts and reduces the amount of time funds are unavailable because they are in the process of being cleared by the recipient.

In some embodiments, the negative certificate management vault 124 is a blockchain. In certain embodiments, the negative certificate management vault 124 is a relational database. As shown, in an example embodiment, the negative certificate management vault 124 includes the following: a negative certificate 202, a global restriction collection 220, a global restriction signatory collection 230, and a local restriction collection 240. It should be noted that the embodiment described herein does exclude other embodiments.

The negative certificate 202 is a digital entity that allows multiple verified stakeholders to collaboratively define and subscribe to sets of activity restrictions associated with an untrusted user in blockchain-based value exchange transactions. In an example embodiment, the negative certificate 202 includes an untrusted party identifier 204, a pointer 206, and a pointer 208. The pointer 206 links the negative certificate 202 to the global restriction collection 220, and the pointer 208 links the negative certificate 202 to the local restriction collection 240.

The untrusted party identifier 204 is associated with the user that is deemed untrusted by at least one member of the consortium 101 of FIG. 1, such as, for example, the first entity computing system 102. In some embodiments, the untrusted party is a person. In other embodiments, the untrusted party is an organization. In some embodiments, the untrusted party identifier 204 is the untrusted user's name. In some embodiments, the untrusted party identifier 204 is one of or a combination of the following: the untrusted user's public key, IP address, MAC address, SSN, PAN, TAN, and/or an account number. In some embodiments, the negative certificate 202 includes further items associated with the untrusted party identifier 204, such as the country or region of origin and/or the destination country or region for value exchange transactions to which the untrusted user is a party. In some embodiments, the negative certificate 202 includes a transaction type such that the untrusted party is blocked, for example, only as a receiver of funds but not as a sender of funds.

Together, the pointer 206 of the negative certificate 202 to the global restriction collection 220 and the pointer 208 of the negative certificate 202 to the local restriction collection 240 constitute an authorization restriction, which includes at least a first global restriction and at least a first local restriction. The authorization restriction prevents the untrusted user from carrying out certain value exchange transactions, as specified by the global restriction collection 220 and/or the local restriction collection 240.

The pointer 206 of the negative certificate 202, linked to the global restriction collection 220, defines a global restriction applicable to the untrusted party 204 and created by at least one member of the consortium 101. The global restriction collection 220 may contain a plurality of global restrictions, including at least a first global restriction. The first global restriction includes at least a global restriction identifier 222 and a pointer 224 to the global restriction signatory collection 230.

The global restriction signatory collection 230 links the members of the consortium 101 who subscribed to the global restriction to that restriction. The global restriction signatory collection 230 includes at least a consortium entity identifier 232 (e.g., the identifier associated with the first entity computing system 102). If another, different member of the consortium 101 subscribes to the first global restriction, this restriction also becomes applicable to this new subscribing party, who is also added to the global restriction signatory collection 230.

The first global restriction is equally applicable, on the same terms, to all the entities that subscribe to it. For example, where a first entity computing system 102 belongs to a fourth bank B4 and a second entity computing system 104 belongs to a fifth bank B5, and both subscribers to the first global restriction prohibit a first untrusted user U1 from sending funds to a second untrusted user U2, neither B4 nor B5 are able to send funds from an account associated with U1 if the funds are directed to U2 or receive funds directed to an account associated with U2 if the sender is U1. This would be true even if one of the parties to the transaction was a bank that did not subscribe to this global restriction, as long as the other party is a subscriber, such as B4 or B5. For example, if U1 had an account at yet another bank B6 and attempted to send funds to U2 at B5, the transaction would not be allowed even if B6 was unaware that U1 was not authorized to send funds to U2.

Referring now to local restrictions, these restrictions are applicable only to their creators. The pointer 208 of the negative certificate 202 is linked to the local restriction collection 240, which contains at least one local restriction created by at least one member of the consortium 101 and applicable only to that member. The local restriction collection 240 includes at least a local restriction identifier 242 and a consortium entity identifier 244 for the member of the consortium 101 that creates and subscribes to the local restriction. The local restriction collection 240 may contain a plurality of local restrictions, including at least a first local restriction.

In the example above, if the restriction specifying that the second untrusted user U2 may not receive funds was a local restriction subscribed to only by its creator, a seventh bank B7, only B7 would be unable to receive the funds associated with the second untrusted user U2.

Referring now to global restrictions and local restrictions in combination using the example presented in reference to FIG. 1, assuming that B2 wanted to block receipts of $500 or greater per day from country C1 when the funds are sent by the sender 108 from any bank but, instead of creating a separate negative certificate, chose to subscribe to an eighths bank's (B8) negative certificate blocking all transactions from C1 from any user, B2 could create a first local restriction pertaining to C1, $500, and B2. The first local restriction would be stored as an authorization restriction associated with B8's negative certificate blocking all transactions from C1 but only in relation to the bank B8. Advantageously, B2, with its more lenient guidelines that do not disallow all C1 transactions outright, could opt out of subscribing to B8's first global restriction. Furthermore, as discussed above, B1 would not have to coordinate its own policies with B2 and B8's policies in order to prevent a loss of its funds to a potential fraudulent $500 transaction originated by B1's sender 108. In other words, B1 would not even need to know that B2 and B8 consider senders from C1 untrusted users. B1 is still able to avoid losing funds associated with fraudulent transfers from B1's accounts by senders from C1.

FIG. 3 is a schematic flow diagram of a method for managing user authorization using a negative certificate, according to an example embodiment. In an example embodiment, the negative certificate 202 of FIG. 2 is managed by the negative certificate authority computing system 116, the various circuits of which, described below, are structured to obtain an authorization restriction, generate a negative certificate, allow a member to digitally sign the negative certificate, broadcast the negative certificate to other members of the consortium 101, access and add a local restriction, and finalize the negative certificate by allowing review and publication of the negative certificate to the negative certificate management vault 124.

At 302, the negative certificate management circuit 118 of the negative certificate authority computing system 116 accesses an authorization restriction associated with a user. The user is an untrusted user. In an example embodiment, the authorization restriction is supplied by the first entity computing system 102. For example, the first entity may be a bank that determines that a particular user should be blocked from transferring funds. The first entity computing system 102 is operated by a first entity, the first entity being one of a plurality of entities of the consortium 101.

At 304, the negative certificate management circuit generates a negative certificate for the untrusted user. In an example embodiment, this includes obtaining a public key associated with the untrusted user. For example, the entity that desires to create a negative certificate for the user may have been a victim of a fraudulent funds transfer attempt performed electronically, which resulted in the user providing its public key to the entity that now wishes to block that user. In some embodiments, the negative certificate management circuit generates an authorization restriction. In some embodiments, the authorization restriction includes at least one of a first global restriction applicable to each of the plurality of entities of the consortium and a first local restriction applicable to the first entity. The global and local restrictions are structured as described, for example, in reference to FIG. 2. The digital signature management circuit 128 of the negative certificate authority computing system 116 allows the member to digitally sign each of the first global restriction and the first local restriction using a private key associated with the first entity computing system 102.

In some embodiments, the first entity computing system 102 is verified as a valid contributor by the contributor management circuit 102 as described above in reference to FIG. 1. Subsequently, the contributor management circuit 122 broadcasts the negative certificate to each member of the consortium 101. At this point, each member of the consortium 101 may decide to subscribe to the global or local restrictions as described in reference to FIG. 2. Thus, each of the plurality of members of the consortium 101 can verify the first global restriction and sign the first global restriction with a private key associated with the respective member. In some embodiments, a different consortium 101 member adds a second local restriction such that at least two parties have their own local restrictions.

At 306, the digital signature management circuit 118 is structured to allow a member to digitally sign the negative certificate as described, for example, in reference to FIG. 1. The negative certificate is digitally signed by a member of the consortium 101, such as the first entity computing system 102, to assure other members of its authenticity. In some embodiments, the encrypted unique address string associated with the first entity computing system 102 is part of the digital signature. In an example embodiment, the digital signature management circuit 118 generates a first hash over the first global restriction. The digital signature management circuit 118 cryptographically protects (signs) the first global restriction using a private key associated with the first entity computing system 102. In some embodiments, the digital signature management circuit 118 generates a second hash over the first local restriction. The digital signature management circuit 118 cryptographically protects (signs) the first local restriction using a private key associated with the first entity computing system 102.

At 308, the contributor management circuit 122 broadcasts the negative certificate to the plurality of entities of the consortium. In some embodiments, the broadcast includes an e-mail message. In some embodiments, the broadcast includes a text message. In some embodiments, the broadcast includes a batch file distributed to each member of the consortium 101 at a pre-determined time interval, such as daily, hourly, or every minute. In some embodiments, the broadcast includes an electronic message or signal sent by an interface engine.

At 310, the negative certificate management circuit 118 allows another consortium 101 member (e.g., a second entity computing system 104) to create its own second local restriction. In certain embodiments where the second entity computing system 104 adds its own second local restriction, the digital signature management circuit 118 generates a third hash over the local restriction. The digital signature management circuit 118 cryptographically protects (signs) the second local restriction using a private key associated with the second entity computing system 102.

At 312, the negative certificate management circuit 118 finalizes the negative certificate. Finalizing makes the certificate available for use by members of the consortium 101. In some embodiments, finalizing the negative certificate includes permitting at least one member of the consortium 101 to review and approve at least the global restriction. This member may be the creator of the global restriction. In some embodiments, finalizing the negative certificate includes publishing the negative certificate to the negative certificate management vault 124.

The arrangements described herein have been described with reference to drawings. The drawings illustrate certain details of specific arrangements that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application-specific integrated circuits (ASICs), field-programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computer in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machine to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A method for managing user authorization for blockchain-based transactions by a plurality of entities in a consortium via a negative certificate, the method comprising:

receiving, by a negative certificate management circuit of a negative certificate authority computing system from an entity computing system associated with a first entity of the plurality of entities in the consortium, an authorization restriction associated with an untrusted user and an IP address of the entity computing system, the authorization restriction comprising a first restriction collection and a second restriction collection, the first restriction collection associated with the first entity and a second entity of the plurality of entities, the second restriction collection associated with the first entity and not associated with the second entity;

generating, by the negative certificate management circuit, a negative certificate for the untrusted user, the negative certificate comprising a first pointer to the first restriction collection, a second pointer to the second restriction collection, and an untrusted user identifier identifying the untrusted user, wherein a digital signature management circuit of the negative certificate authority computing system signs the negative certificate;

generating, by the contributor management circuit of the negative certificate authority computing system, a private key, a public key, and a unique cryptographically generated address associated with the first entity, the unique cryptographically generated address generated based on the public key and the IP address of the entity computing system;

storing, by the contributor management circuit, the public key associated with the first entity in a contributor vault and the unique cryptographically generated address in a secure contributor record;

verifying, by the digital signature management circuit, at least a portion of the unique cryptographically generated address matches the IP address of the entity computing system;

signing, by the digital signature management circuit, at least one restriction of the first restriction collection using a private key associated with the first entity;

determining, by the negative certificate management circuit, that at least a threshold number from the plurality of entities in the consortium approved the authorization restriction;

receiving, by a transaction clearance management circuit of the negative certificate authority computing system, a requested blockchain transaction from a pre-validation pool associated with a blockchain, the blockchain transaction comprising a verification attribute corresponding to at least one aspect of the blockchain transaction;

determining, by the transaction clearance management circuit and based on the first pointer, the second pointer, and at least one of the verification attribute or the untrusted user identifier of the negative certificate, that the requested blockchain transaction is associated with the untrusted user; and in response to determining that the requested blockchain transaction violates at least one of the first restriction collection or the second restriction collection, writing, by the transaction clearance management circuit, the requested blockchain transaction to a quarantine blockchain communicatively coupled to the transaction clearance management circuit, the quarantine blockchain different from the blockchain.

2. The method of claim 1, wherein the requested blockchain transaction is a financial transaction that comprises at least one of a funds sender identifier and a funds receiver identifier, and wherein the first entity is identified by the at least one of a funds sender identifier and a funds receiver identifier.

3. The method of claim 1, wherein the authorization restriction comprises a global restriction, and wherein the threshold number is sufficient to make the authorization restriction applicable to more than one of the plurality of entities.

4. The method of claim 3, wherein the requested blockchain transaction is a financial transaction that comprises at least one of a funds sender identifier and a funds receiver identifier, and wherein one of the more than one of the plurality of entities is identified by the at least one of a funds sender identifier and a funds receiver identifier.

5. The method of claim 1, wherein the untrusted user identifier comprises at least one of a cryptographic key, an SSN, a name, an account number, and a PAN.

6. The method of claim 1, wherein the authorization restriction comprises at least one of a geographical region, a transaction type, and a TAN.

7. A negative certificate authority computing system for managing user authorization for blockchain-based transactions by a plurality of entities in a consortium via a negative certificate, communicatively coupled to a transaction blockchain and a quarantine blockchain, the negative certificate authority computing system comprising:

at least one processor; and a memory storing computer executable instructions when executed by at least one processor causes the at least one processor to:

receive, from an entity computing system associated with a first entity of the plurality of entities in the consortium, an authorization restriction associated with an untrusted user and an IP address of the entity computing system, the authorization restriction comprising a first restriction collection and a second restriction collection, the first restriction collection associated with the first entity and a second entity of the plurality of entities, the second restriction collection associated with the first entity and not associated with the second entity;

generate a negative certificate for the untrusted user, the negative certificate comprising a first pointer to the first restriction collection, a second pointer to the second restriction collection, and an untrusted user identifier identifying the untrusted user;

generate a private key, a public key, and a unique cryptographically generated address associated with the first entity, the unique cryptographically generated address generated based on the public key and the IP address of the entity computing system;

store the public key associated with the first entity in a contributor vault and the unique cryptographically generated address in a secure contributor record;

verify at least a portion of the unique cryptographically generated address matches the IP address of the entity computing system;

sign at least one restriction of the first restriction collection using a private key associated with the first entity;

determine that at least a threshold number from the plurality of entities in the consortium approved the authorization restriction;

receive a requested blockchain transaction from a pre-validation pool associated with the transaction blockchain, the blockchain transaction comprising a verification attribute corresponding to at least one aspect of the blockchain transaction;

determine, based on the first pointer, the second pointer, and at least one of the verification attribute or the untrusted user identifier of the negative certificate, that the requested blockchain transaction is associated with the untrusted user; and in response to determining that the requested blockchain transaction violates at least one of the first restriction collection or the second restriction collection, write the requested blockchain transaction to the quarantine blockchain communicatively coupled to the transaction clearance management circuit, the quarantine blockchain different from the transaction blockchain.

8. The negative certificate authority computing system of claim 7, wherein the requested blockchain transaction is a financial transaction that comprises at least one of a funds sender identifier and a funds receiver identifier, and wherein the first entity is identified by the at least one of a funds sender identifier and a funds receiver identifier.

9. The negative certificate authority computing system of claim 7, wherein the authorization restriction comprises a global restriction, and wherein the threshold number is sufficient to make the authorization restriction applicable to more than one of the plurality of entities.

10. The negative certificate authority computing system of claim 9, wherein the requested blockchain transaction is a financial transaction that comprises at least one of a funds sender identifier and a funds receiver identifier, and wherein one of the more than one of the plurality of entities is identified by the at least one of a funds sender identifier and a funds receiver identifier.

11. The negative certificate authority computing system of claim 7, wherein the untrusted user identifier comprises at least one of a cryptographic key, an SSN, a name, an account number, and a PAN.

12. The negative certificate authority computing system of claim 7, wherein the authorization restriction comprises at least one of a geographical region, a transaction type, and a TAN.

13. One or more non-transitory computer-readable media having computer-executable instructions embodied therein that, when executed by at least one processor, causes the at least one processor to perform computer-executable operations for managing user authorization for blockchain-based transactions by a plurality of entities in a consortium via a negative certificate, the computer-executable operations comprising:

receiving, from an entity computing system associated with a first entity of the plurality of entities in the consortium, an authorization restriction associated with an untrusted user and an IP address of the entity computing system, the authorization restriction comprising a first restriction collection and a second restriction collection, the first restriction collection associated with the first entity and a second entity of the plurality of entities, the second restriction collection associated with the first entity and not associated with the second entity;

generating a negative certificate for the untrusted user, the negative certificate comprising a first pointer to the first restriction collection, a second pointer to the second restriction collection, and an untrusted user identifier identifying the untrusted user;

generating a private key, a public key, and a unique cryptographically generated address associated with the first entity, the unique cryptographically generated address generated based on the public key and the IP address of the entity computing system;

storing the public key associated with the first entity in a contributor vault and the unique cryptographically generated address in a secure contributor record;

verifying at least a portion of the unique cryptographically generated address matches the IP address of the entity computing system;

signing at least one restriction of the first restriction collection using a private key associated with the first entity;

determining that at least a threshold number from the plurality of entities in the consortium approved the authorization restriction;

receiving a requested blockchain transaction from a pre-validation pool associated with a blockchain, the blockchain transaction comprising a verification attribute corresponding to at least one aspect of the blockchain transaction;

determining, based on the first pointer, the second pointer, and at least one of the verification attribute or the untrusted user identifier of the negative certificate, that the requested blockchain transaction is associated with the untrusted user; and in response to determining that the requested blockchain transaction violates at least one of the first restriction collection or the second restriction collection, writing the requested blockchain transaction to a quarantine blockchain communicatively coupled to the transaction clearance management circuit, the quarantine blockchain different from the blockchain.

14. The non-transitory computer-readable media of claim 13, wherein the requested blockchain transaction is a financial transaction that comprises at least one of a funds sender identifier and a funds receiver identifier, and wherein the first entity is identified by the at least one of a funds sender identifier and a funds receiver identifier.

15. The non-transitory computer-readable media of claim 14, wherein the authorization restriction comprises a global restriction, and wherein the threshold number is sufficient to make the authorization restriction applicable to more than one of the plurality of entities.

16. The non-transitory computer-readable media of claim 15, wherein the requested blockchain transaction is a financial transaction that comprises at least one of a funds sender identifier and a funds receiver identifier, and wherein one of the more than one of the plurality of entities is identified by the at least one of a funds sender identifier and a funds receiver identifier.

17. The non-transitory computer-readable media of claim 13, wherein the untrusted user identifier comprises at least one of a cryptographic key, an SSN, a name, an account number, and a PAN and wherein the authorization restriction comprises at least one of a geographical region, a transaction type, and a TAN.

\* \* \* \* \*